(12) United States Patent
Leuthold et al.

(10) Patent No.: US 6,922,502 B2
(45) Date of Patent: Jul. 26, 2005

(54) OPTICAL FILTERING METHOD AND APPARATUS

(75) Inventors: Juerg Leuthold, Eatontown, NJ (US); Dan Mark Marom, Howell, NJ (US); David Thomas Neilson, Old Bridge, NJ (US); Roland Ryf, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 46 days.

(21) Appl. No.: 10/396,238

(22) Filed: Mar. 25, 2003

(65) Prior Publication Data

US 2004/0190823 A1 Sep. 30, 2004

(51) Int. Cl.⁷ .................................................. G02B 6/26
(52) U.S. Cl. ............................ 385/27; 385/15; 385/24
(58) Field of Search ............................ 385/15, 24, 27

(56) References Cited

U.S. PATENT DOCUMENTS

| 5,381,362 A | 1/1995 | Shen et al. ................. 364/825 |
| 5,801,858 A | 9/1998 | Roberts et al. ............. 359/114 |
| 6,292,598 B1 * | 9/2001 | Price et al. .................... 385/2 |
| 6,351,581 B1 * | 2/2002 | Doerr et al. ................. 385/24 |
| 6,426,821 B1 * | 7/2002 | Price et al. ................. 398/152 |
| 6,515,792 B1 * | 2/2003 | Hakimi et al. .............. 359/326 |
| 6,766,074 B1 * | 7/2004 | Dingel et al. ................. 385/24 |

FOREIGN PATENT DOCUMENTS

| EP | 1 065 821 A2 | 1/2001 | ............ H04J/14/02 |
| EP | 1 089 401 A1 | 4/2001 | ........... H01S/3/067 |

OTHER PUBLICATIONS

Y. Ding et al., "Femtosecond Pulse Shaping By Dynamic Holograms In Photorefractive Multiple Quantum Wells", *Optics Letters*, vol. 22, No. 10, May 15, 1997, pp 718–720.

* cited by examiner

Primary Examiner—John R. Lee
Assistant Examiner—Paul M. Gurzo
(74) Attorney, Agent, or Firm—David A. Sasso

(57) ABSTRACT

An optical filter apparatus for processing an optical signal comprising a spectrum broadening device for spectrally dividing one or more channels of the optical signal into a discrete set of spectral components for each channel, a collector for collecting the spectral components on a discrete number of corresponding light channels, one or more processors for individually processing one or more of the spectral components on the light channels, and a combiner for recombining the spectral components on the light channels.

18 Claims, 6 Drawing Sheets

OPTICAL FILTERING METHOD AND APPARATUS

TECHNICAL FIELD

The present invention relates generally to the field of optical communications, and more particularly to a method and apparatus for optical filtering to perform functions such as signal format conversion, signal regeneration, and/or all-optical wavelength conversion.

BACKGROUND OF THE INVENTION

Fiber optic telecommunication networks use optical signals to transmit data and voice information. The data and voice information is typically generated in a transmitter, transmitted over an optical fiber network, switched in cross-connects and routers and finally converted back into an electrical signal in a receiver. During transmission of an optical signal, an optical filter may be used at several stages. For example, an optical filter may be used in a transmitter to provide signal format conversion. In a transparent network, optical filters might be necessary to regenerate the signal during transmission or to perform all-optical wavelength conversion to avoid wavelength blocking. Finally, optical filters might be needed to compensate for dispersion.

Prior art devices such as pulse shapers have been proposed for modifying the temporal characteristic of a pulse sequence by first spectrally broadening the signal and introducing amplitude and phase masks across the continuous spectrum of the signal using a photorefractive or holographic lens, before recombining the pulses. Such devices are, however, limited in their ability to provide signal processing on individual spectral components of an optical signal It would be desirable, therefore, to have a method and apparatus which provides for flexible and individual processing of discrete spectral components of an optical signal to provide real time delays between discrete spectral components and/or to allow signal format conversion, signal regeneration, wavelength conversion and/or dispersion compensation.

SUMMARY OF THE INVENTION

In accordance with one embodiment of the present invention, an optical filter apparatus for processing an optical signal is provided comprising a spectrum broadening device for spectrally dividing one or more channels of the optical signal into a discrete set of spectral components for each channel, a collector for collecting the spectral components on a discrete number of corresponding light channels, one or more processors for individually processing one or more of the spectral components on the light channels, and a combiner for recombining the spectral components on the light channels.

In another embodiment of the invention a method of optical filtering is provided comprising spectrally dividing one or more channels of an optical signal into a discrete set of spectral components for each channel, collecting the spectral components on a discrete number of corresponding light channels, individually processing one or more spectral components on the light channels, and recombining the spectral components on the light channels.

In another embodiment of the invention a wavelength converter apparatus is provided comprising a nonlinear medium for encoding information from a first optical signal onto a second optical signal of a desired wavelength to generate a third optical signal, and an optical filter apparatus operatively coupled to the nonlinear medium for processing the third optical signal. The optical filter apparatus comprises a spectrum broadening device for spectrally dividing the third optical signal into a discrete set of spectral components on a discrete number of corresponding light channels, and one or more processing devices for individually processing one or more of the spectral components on the light channels. The optical filter apparatus is adaptable to provide an amplitude and time delay response such that a desired shaped output signal is generated.

In another embodiment of the invention an optical regenerator is provided comprising a nonlinear medium for encoding information from a first optical signal onto a periodically modulated second optical signal to generate a third optical signal, and an optical filter apparatus operatively coupled to the nonlinear medium for processing the third optical signal. The optical filter apparatus comprises a spectrum broadening device for spectrally dividing the third optical signal into a discrete set of spectral components on a discrete number of corresponding light channels, and one or more processing devices for individually processing one or more of the spectral components on the light channels. The optical filter apparatus is adapted to provide an amplitude, phase and frequency response to produce a desired output signal. The desired output signal may be a regenerated first optical signal. The 'regenerated signal', as used herein, refers to a signal with an improved pulse shape (e.g. shorter full-width half-maximum (FWHM), improved extinction ratio, improved contrast ratio, improved optical signal-to-noise ratio (ONSR), and/or retiming).

BRIEF DESCRIPTION OF THE DRAWINGS

The present invention will be more fully appreciated by consideration of the following detailed description, which should be read in light of the drawings in which.

DETAILED DESCRIPTION

Figure 1:
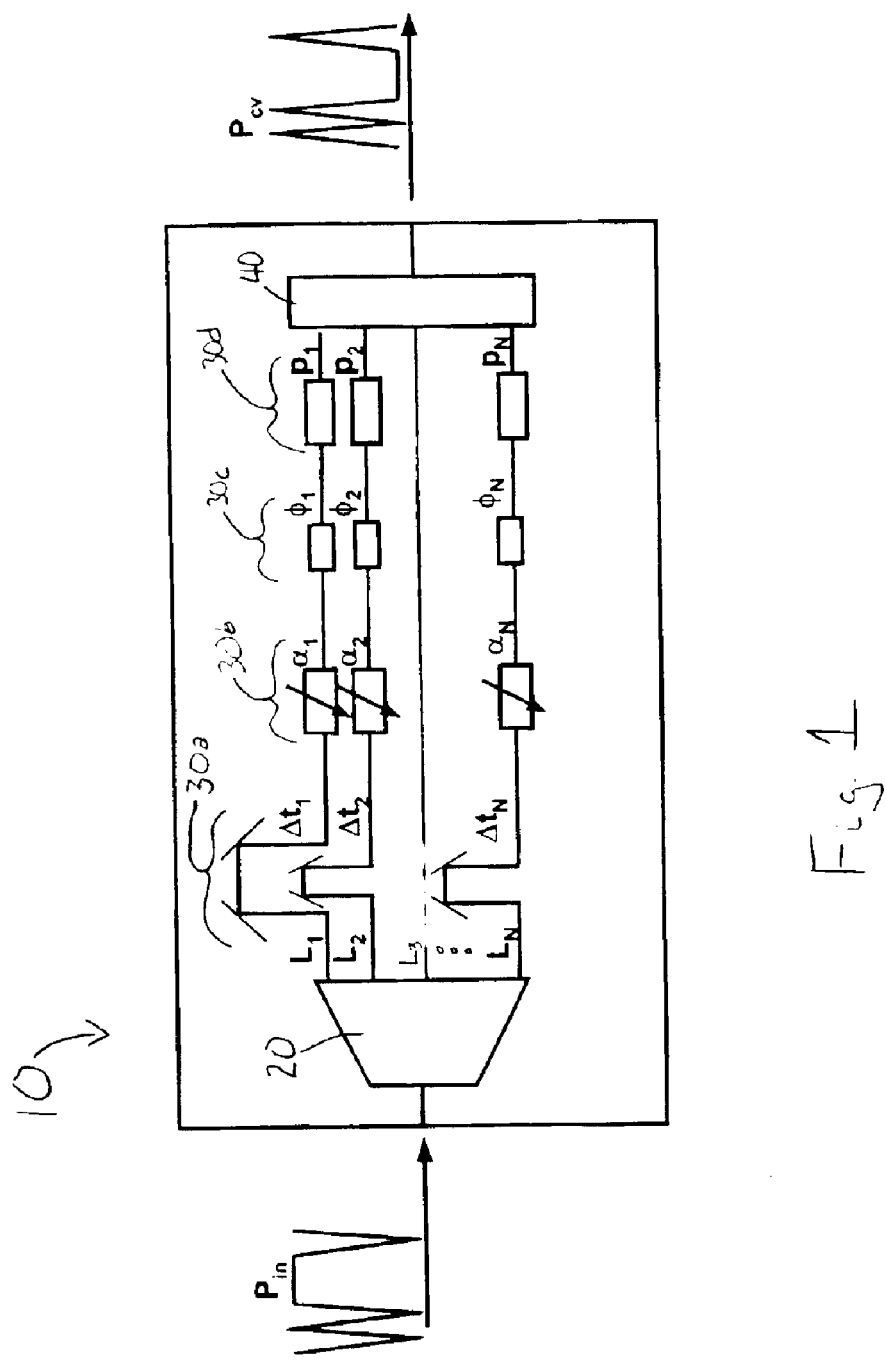
FIG. 1 is a schematic drawing of an optical filter apparatus in accordance with one embodiment of the present invention.

A schematic diagram of an optical filter apparatus 10 in accordance with one embodiment of the present invention is shown in FIG. 1. The optical filter 10 preferably comprises a spectrum broadening device 20 for spectrally broadening an optical signal ($P_{in}$) introduced into the optical filter 10. The spectrum broadening device 20 spectrally divides one or more channels or wavelengths of the optical signal ($P_{in}$) into a discrete set of spectral components. It can be understood by those skilled in the are that the optical signal ($P_{in}$) may be a wavelength multiplexed signal. The spectrum broadening device 20 may be realized as an optical prism, a grating, a waveguide grating router, a uniformly or non-uniformly index graded media or by other means known in the art.

A collector device operatively coupled to the spectrum broadening device 20 is also included in the optical filter 10 for collecting each of the discrete spectral components of the optical signal ($P_{in}$) on a discrete number of corresponding light channels ($L_1 \ldots L_N$). The collector device may comprise a plurality of finite mirrors 30a for collecting portions of the spectrum as shown in the embodiment of FIG. 1, or alternatively a plurality of planar waveguides (not shown). It is understood, however, that there are many ways to collect and channel light which can be used in accordance with the present invention.

One or more processor devices 30a–30d operatively coupled to the collector devices are preferably provided for individually processing one or more spectral component on the light channels ($L_1 \ldots L_N$). The processor devices 30a–30d may include one or more delay devices 30a for providing time delays ($\Delta t_1 \ldots \Delta t_N$) for one or more of the spectral components on the light channels ($L_1 \ldots L_N$). As can be understood from FIG. 1, the collector device 30a may serve as both a collector device, discussed above, and a delay device to provide time delays ($\Delta t_1 \ldots \Delta t_N$) for one or more spectral components. The delay provided by the delay devices 30a may be on the order of several hundreds of wavelengths. The processor devices 30a–30d may also include an amplifier/attenuator 30b, a phase shifter 30c and/or a signal processor 30d for providing individual pulse shaping of one or more of the spectral components on the light channels ($L_1 \ldots L_N$).

A combiner 40 is also preferably provided for recombining the spectral components on the light channels ($L_1 \ldots L_N$) into the one or more channels of the optical signal ($P_{in}$) to generate an output signal ($P_{CV}$). The combiner 40 may be a star coupler, a multimode-interference coupler, a directional coupler, a y-branch coupler, a grating, a waveguide grating router, a lens or the like.

In accordance with an embodiment as shown in FIG. 1, the optical filter operates as follows. An optical signal $P_{in}$ is introduced into the optical filter 10 to convert the signal $P_{in}$ into a new signal $P_{CV}$ having desired characteristics. The incoming signal $P_{in}$ is spectrally broadened in the spectrum broadening device 20. The spectral components are collected into a discrete number of light channels ($L_1, \ldots, L_N$).

Once the spectral components are collected into light channels, each signal in the channels can be processed individually. For instance one can add individual time delays ($\Delta t_1, \ldots, \Box \Delta t_N$), attenuate or amplify each channel individually by factors ($\alpha_1, \ldots, \Box \alpha_N$), change phase-offsets individually ($\phi_1, \ldots, \Box \phi_N$) or do signal processing on the individual light channels ($p_1, \ldots, \Box p_N$). Signal processing may include turning on and off of individual channels, modulating individual channels, or the like. It can be appreciated by those skilled in the art that all of the aforementioned elements need not be applied to each light channel (e.g. $L_3$ of FIG. 1), and the order of application may be varied.

The light channels are then preferably recombined in a combiner 40. As discussed above the combiner may be realized as one ore more star couplers, multimode-interference couplers, directional couplers, y-branch couplers, with lenses or by a variety of other means. The recombined signal $P_{CV}$ at the output of the optical filter 10 will then carry the new signal shape, amplitude and phase relation as implemented by the processor devices 30a–30d.

Figure 2:
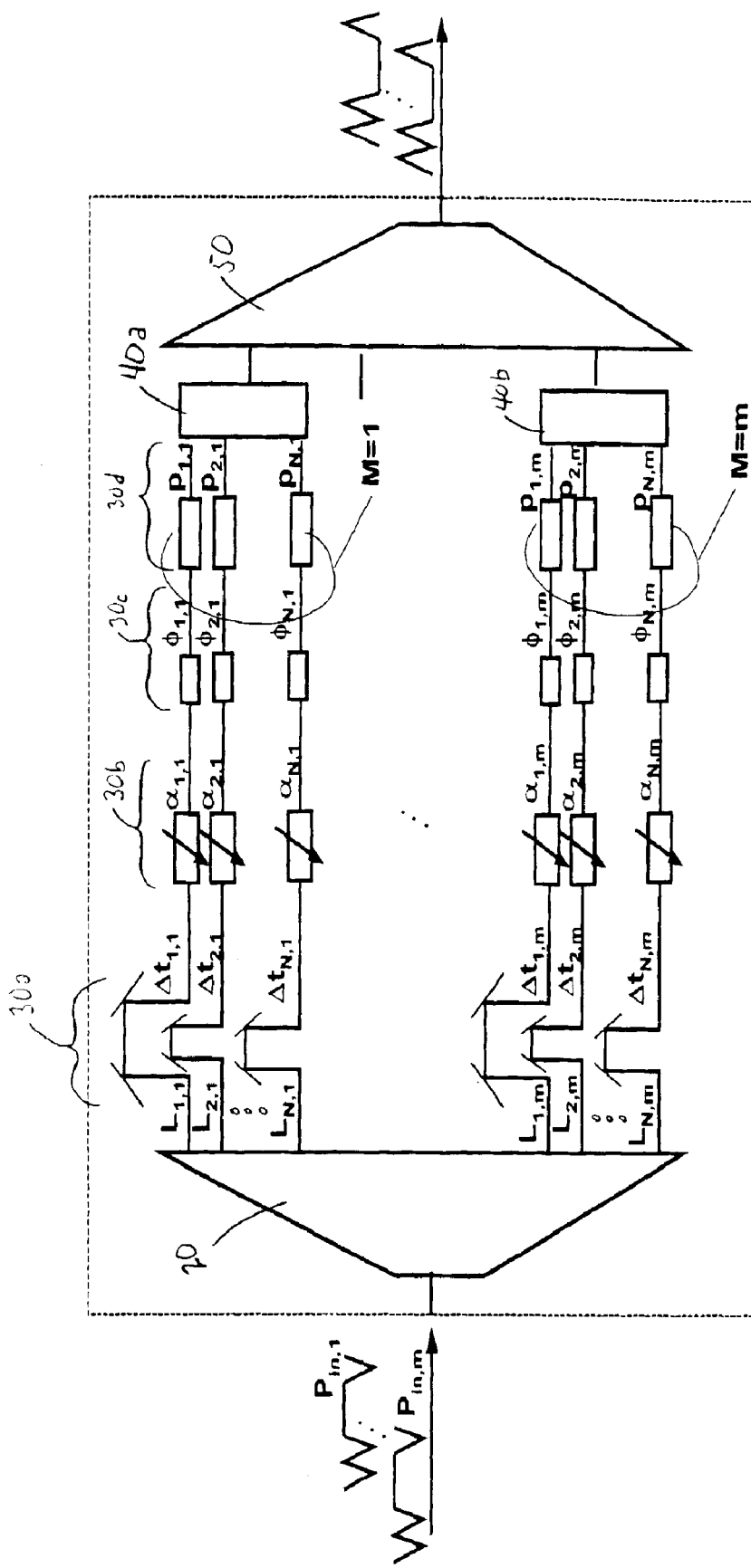
FIG. 2 is a schematic drawing of an optical filter apparatus in accordance with a second embodiment of the present invention.

As can be understood from FIG. 2, the present invention may be adapted to handle wavelength-multiplexed signals. In order to process multiplexed signals of different wavelengths the spectrum broadening device 20 divides the spectral components of one or more different Signals ($P_{in,1} \ldots P_{in,m}$) into their various spectral components. Each of the m incoming signals can have a different wavelength and each of the signals may be spectrally sliced into N components. The components are guided into N light channels and treated/processed individually by one or more of the processing devices 30a–30d as appropriate for a given application. After being passed through the appropriate processing devices 30a–30d, the signals may then be combined by couplers (40a, 40b) and/or a second spectrum broadening device 50 (which is used to narrow the spectrum of the spectral components on light channels $L_{1,1} \ldots L_{N,m}$).

In an alternate embodiment a single spectrum broadening device 50 is used for both combining the spectral slices and combining the signals with different wavelengths. In another alternate embodiment a single spectrum broadening device 40 can be used for both spectrally dividing the input signal (s) and combining the spectral components or slices in a single wavelength application, or, in multiplexed wavelength applications, to divide and combine signals of different wavelengths.

It can be appreciated by those skilled in the art that various implementations of the present invention may be based on planar lightwave circuits in Silicon Optical Bench technology, Silicon on Insulator technology, InP and related materials technology, GaAs and/or related technology, polymer technology or the like.

Implementations as planar lightwave circuits may make use of waveguide grating router (WGR) for broadening the spectrum and coupling different spectral components into different waveguides that serve as light channels. The light in the light channels can then be guided into delays to introduce time delays, phase shifters to provide a thermal or electrical phase-shifter, attenuators in the form of absorbing or gain media, or tunable couplers to recombine the spectral components into a signal.

An exemplary embodiment based on a micro-electromechanical system (MEMS) switch technology in accordance with the invention is discussed below with reference to FIG. 3 and with respect to an application for all-optical wavelength conversion.

To perform all-optical wavelength conversion we first introduce a first optical signal $P_{in}$ into a nonlinear media 310, in this example a semiconductor optical amplifier (SOA). Alternatively, other nonlinear media may be used such as, for example, nonlinear fiber, $LiNbO_3$ materials, nonlinear glass materials, nonlinear plastics, electroabsorption modulators, semiconductor optical amplifier (SOA) materials and/or the like.

The signal information (of $P_{in}$) is encoded or mapped by means of nonlinear processes (e.g. SOA cross-gain and cross-phase modulation) onto a second signal $P_{CW}$ that is also introduced to the SOA 310. The second signal $P_{CW}$ is preferably a carrier wave signal that has the desired wavelength to be generated by the wavelength conversion. A chirped and inverted signal $P_{inv}$ is generated at the SOA 310 output at the wavelength of the cw light.

To find the amplitude and phase (i.e. group delay) response for an optical filter that converts the $P_{inv}$ signal back into a Gaussian signal the amplitude and phase response spectrum of the signal $P_{inv}$ at the input of the optical filter 320 is determined. The time response 330 of the signal that is guided into the SOA 310 and the phase as well as the amplitude response 340 of the signal after the SOA 310 is depicted in FIG. 3. The optical filter 320 is used to perform a linear operation on the input signal $P_{inv}$ such that the output $P_{CV}$ is a Gaussian shaped signal.

Since both the amplitude and phase response 340 of the signal $P_{inv}$ at the input to the optical filter 320 and the amplitude 370 and phase response at the output of the filter 320 are known, the ideal inverted filter response can be calculated with filter theory. Specifically, if $H_{out}(\omega)$ is the complex frequency response of the signal at the output of the optical filter 320, $H_{in}(\omega)$ is the complex frequency response of the signal guided into the optical filter 320, then the optical filter 320 preferably has the following complex frequency response:

$$H_{MOF}(\omega)=H_{out}(\omega)/H_{in}(\omega).$$

Figure 3:
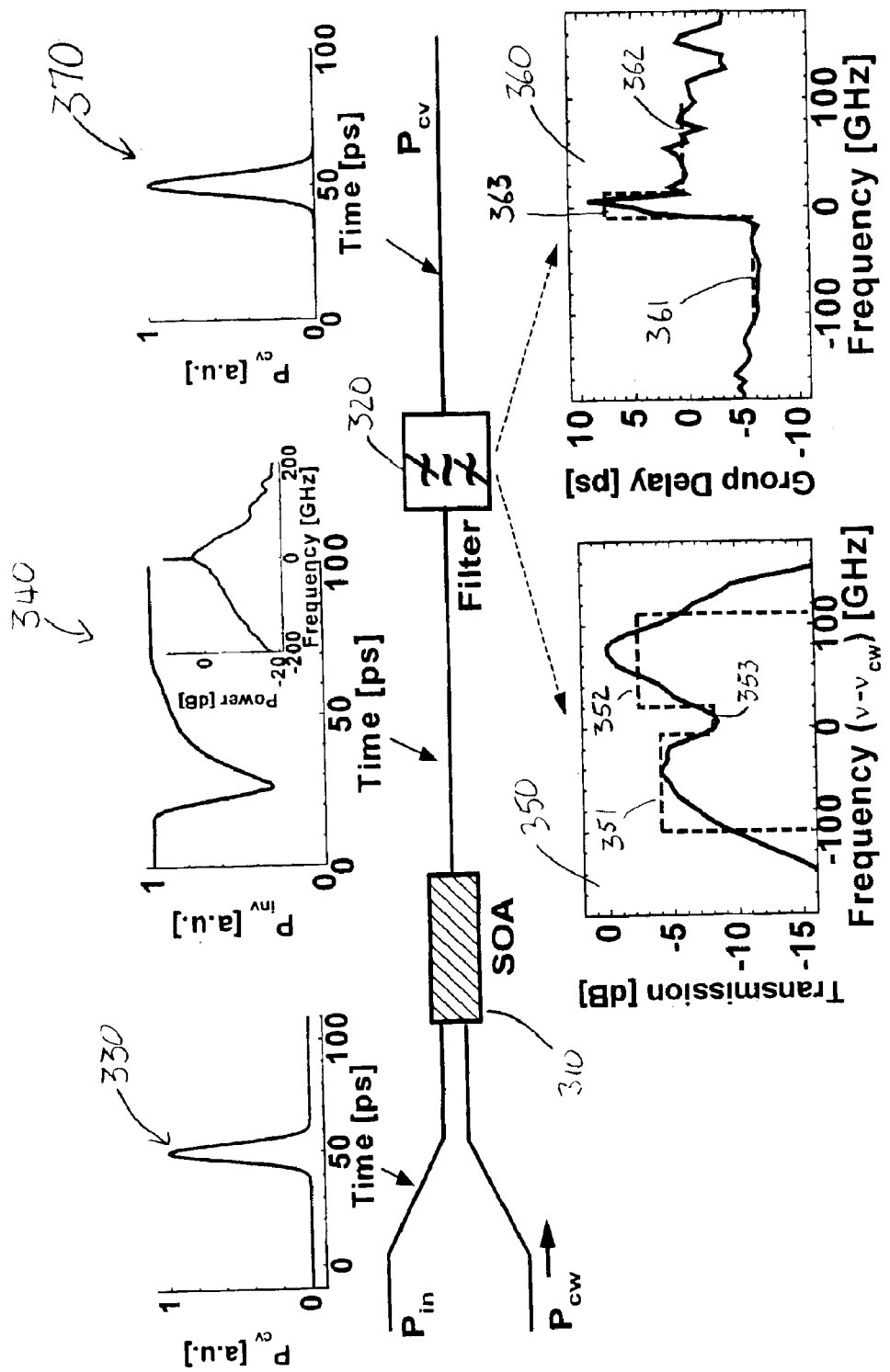
FIG. 3 is a schematic drawing of a wavelength converter apparatus in accordance with one embodiment of the present invention.

The transmission and group delay response 350, 360 of the optical filter 320 of this application is calculated and shown at the bottom of FIG. 3. The approximate transmission of an optical filter 351, 352, 353, and the approximate group delay 361, 362, 363 of an optical filter that converts the $P_{inv}$ signal back into a Gaussian signal, are also shown as dashed lines.

In order to realize the optical filter for wavelength conversion according to this embodiment of the invention, the frequency response spectrum of the filter 320 was divided into a finite number of discrete spectral slices or components that each have a certain amplitude and group delay response. As shown in FIG. 3(bottom, 350,360) the transmission and group delay spectrum of the optical filter 320 were divided into three spectral slices, two broad spectral slices 351, 352, 361, 362 left and right of the cw signal frequency, and narrow spectral slices 353, 363 around the cw frequency. It is understood that the number of spectral slices can be increased to improve the approximation of the ideal filter.

Figure 4:
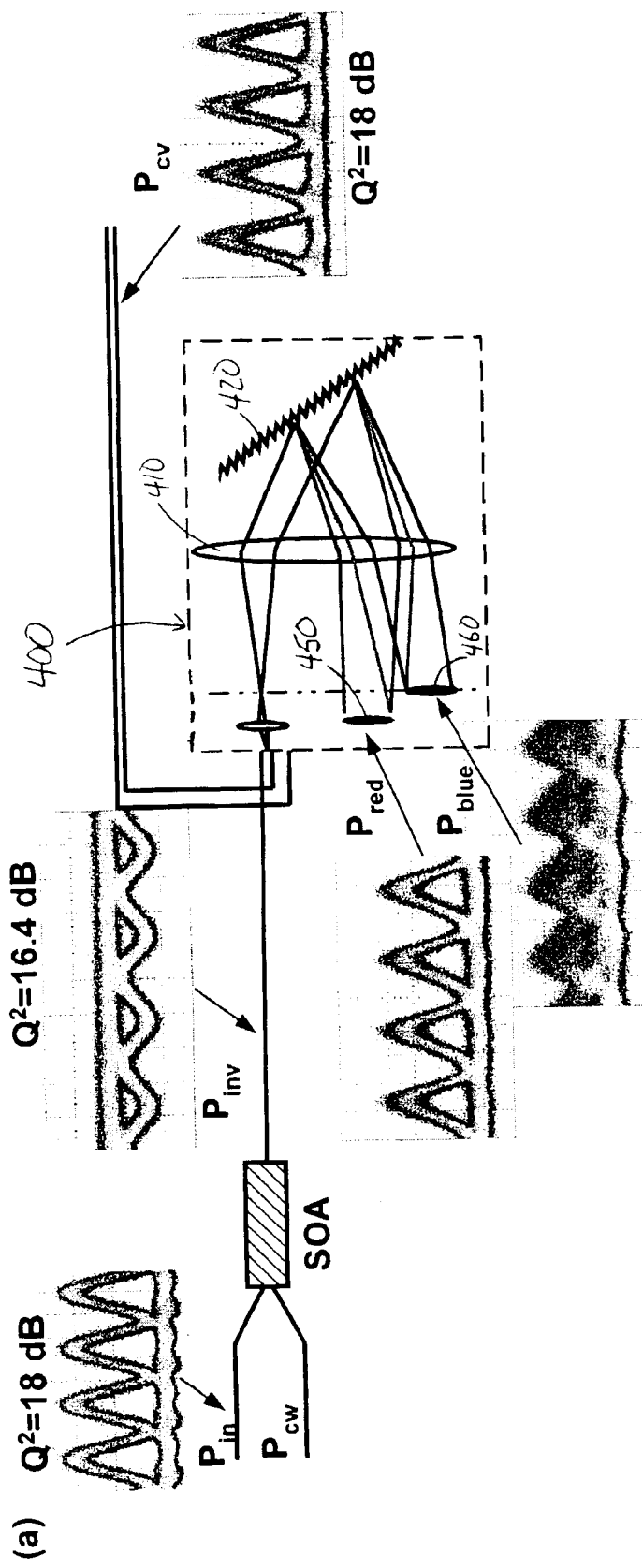
FIG. 4 is a schematic drawing of an embodiment of an optical filter apparatus for use with the wavelength converter apparatus of FIG. 3.

Details of one embodiment of an optical filter 400 for use with the embodiment of FIG. 3 are shown in FIG. 4. As can be understood from FIG. 4, the inverted signal $P_{inv}$ that is to be filtered, is launched through a lens 410 onto a grating 420, which spectrally decomposes the optical signal. Two MEMS mirrors 450, 460 are placed in the extension of the reflected optical signal with a narrow absorbing area therebetween. The two mirrors 450, 460 preferably cover—with respect to the cw wavelength of $P_{CW}$ from which the inverted signal is derived—a 90 GHz red shift and a 90 GHz blue shift region. The MEMS mirrors 450, 460 can be actuated to move back and forth and rotated such that one can introduce time delays as well as attenuation for different spectral components.

The calculations from FIG. 3 show, that for generating an RZ to RZ wavelength conversion at 40 Gb/s one needs to introduce approximately a 5 ps delay between the red and blue spectral components and an additional attenuation on the red spectral component. The narrow spectral central region is dominated by the cw signal. This spectral region needs to be absorbed, which is obtained through the narrow slit in between the mirrors.

The optical filter 400 may be used to perform operations as discussed above or alternatively, the optical filter 400 may be used to perform other operation as well. As an example, we can use the optical filter 400 for performing all-optical wavelength conversion and switching. Such a device can be implemented as a 1×2 MEMS switch fabric. Switching is obtained by tilting the two mirrors so that the light from the two mirrors either combines in a first or the second output fiber.

For this simple situation, where we only perform RZ to RZ wavelength conversion, the optical filter of one embodiment of the present invention can also be understood as follows. The inverted signal $P_{inv}$ comprises two main spectral components. The main components are the red chirped spectral part that is due to the initial carrier depletion within the SOA and the subsequent blue-chirped part that is due to the subsequent carrier relaxation in the SOA. The optical filter of one embodiment of the present invention basically delays the red with respect to the blue-chirped signal and combines them by means of signal beating.

An experiment was performed to test some aspects of an embodiment of the invention, discussed above, by generating a 10 Gb/s pseudorandom bit sequence (PRBS) of length $2^{31}-1$ and electrically multiplexing the bit sequence to 40 Gb/s. The 40 Gb/s signal was then encoded onto 33% RZ pulses at a signal wavelength λ=1559 nm. The wavelength of the cw source was λ=1553 nm. A 2 mm long tensile strained bulk SOA was used to provide the necessary nonlinearities for switching. The current applied to the SOA was 700 mA. At the receiver an electroabsorption modulator was used to demultiplex the optical signal from 40 to 10 Gb/s before the signal was evaluated in a bit error rate tester.

The test result discussed below show that noninverted wavelength conversion as well as bit-inverted all-optical wavelength conversion can be accomplished using a system and method according to embodiments of the invention. The results of the noninverted 40 Gb/s wavelength conversion experiment and the results for the bit-inverted wavelength conversion are discussed below.

For performing noninverted RZ to RZ signal wavelength conversion, we introduced a 5 ps delay between the red chirped and the blue chirped spectral components, this is obtained by actuating the mirrors and thereby changing the path length. Eye diagrams of this experiment are depicted in FIG. 4. Signal qualities were measured with a bit-error tester. We found values of 18, 16.4 and 18 for the input data signal $P_{in}$, the inverted signal $P_{inv}$ between the SOA and the optical filter 400, and the converted signal $P_{CV}$, respectively. The eye of the converted signal is clear and open. The full-width half-maximum (FWHM) of the converted signal is reduced with respect to the FWHM of the input signal. The pulse width regeneration is obtained as a result of the signal beating between the two spectral components. The eye diagrams were taken with input signal powers of 3 dBm and a cw signal power of 6.8 dBm. All signal powers were measured in the fiber before the device.

Figure 5:
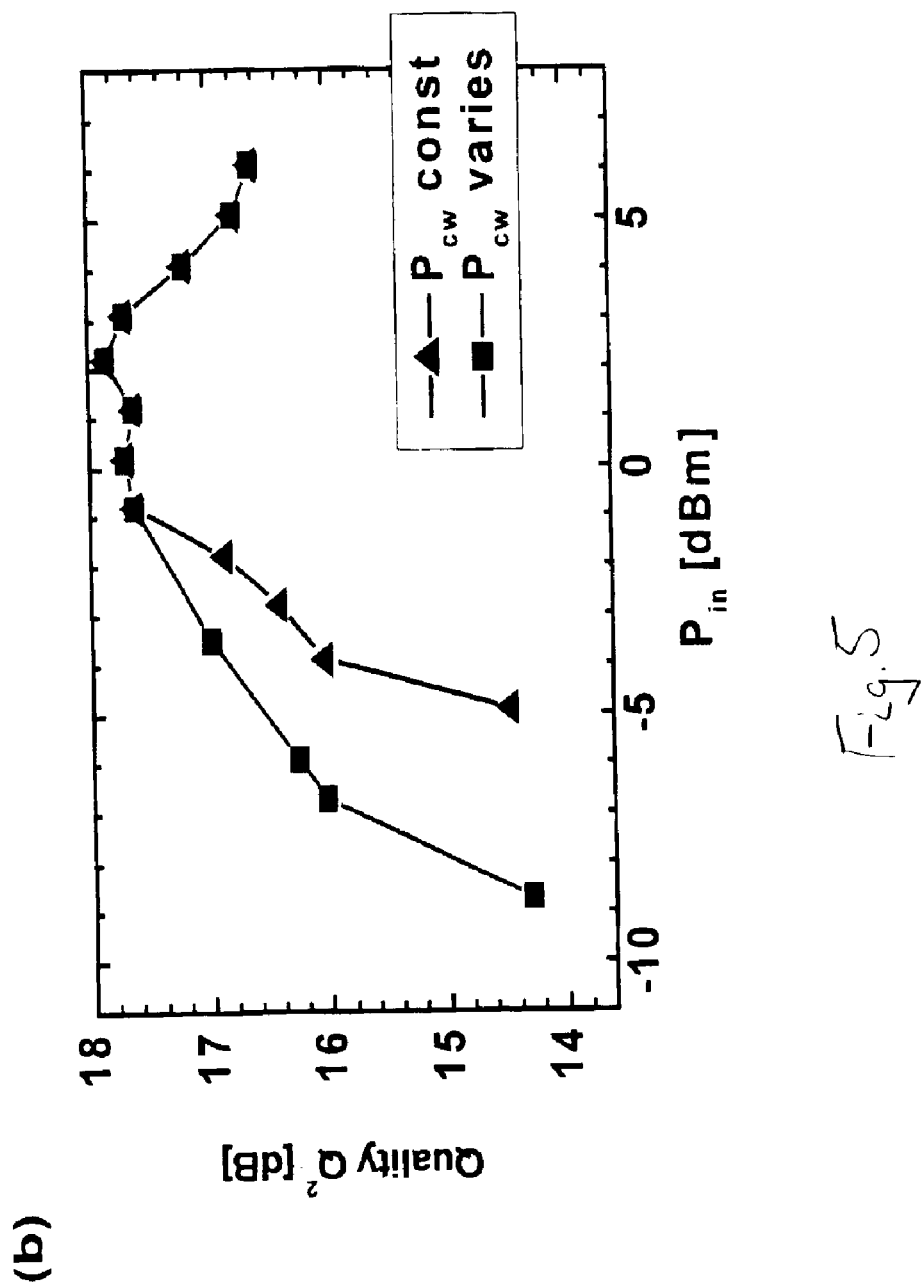
FIG. 5 is a plot showing signal qualities for various input powers for an embodiment of the invention.

Signal qualities for various input powers are given in FIG. 5. An input power dynamic range of 10 dB (with qualities better than 15.6 dB) is found when the cw signal power $P_{CW}$ is not adapted to the input power $P_{in}$ (triangles). If we allow for adaptation of the cw signal power $P_{CW}$ to the power of the input signal Pin the input power dynamic range greatly increases and wavelength conversion with bit error rates below about $1 \cdot 10^{-9}$ is possible with as little as about −7 dBm (squares).

For performing bit inverted wavelength conversion we calculated the optical filter parameters accordingly. Bit-inverted conversion is obtained when the blue chirped spectral components are delayed by approximately 12 ps with respect to the red-chirped spectral components and when the cw spectral component passes unfiltered. With a MEMS based device in accordance with an embodiment of the invention is employed the mirrors only need to be activated and moved to other positions in order to change the format.

Figure 6:
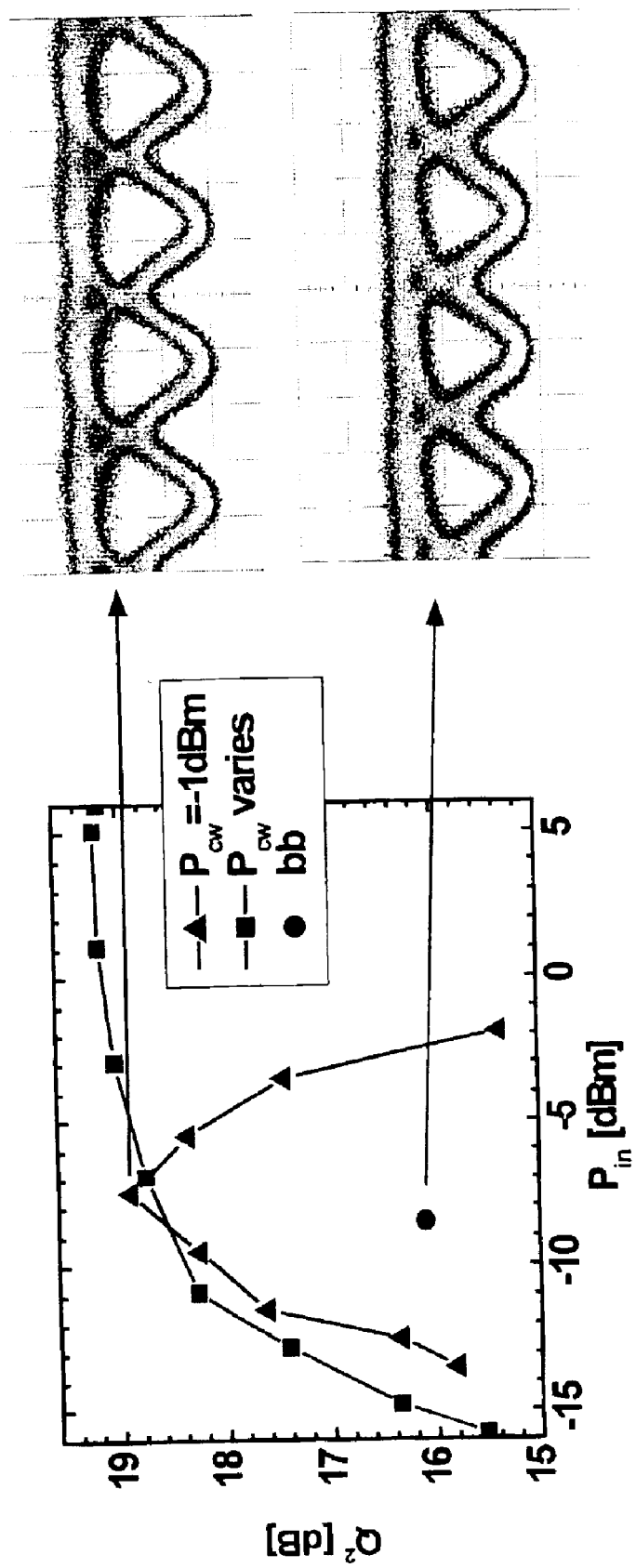
FIG. 6 is another plot showing signal qualities for various input powers for another embodiment of the invention.

Signal qualities of the bit-inverted experiment are shown in the plot of FIG. 6. It can be appreciated that bit-inverted wavelength conversion with as little as about −16 dBm (i.e.

0.6 fJ per pulse) leads to bit error rates below about $1 \cdot 10^{-9}$. The input dynamic range exceeds 20 dB when the cw signal $P_{CW}$ is adapted to the power of the input signal $P_{in}$, and the input dynamic range is approximately 11 dB when the cw signal $P_{CW}$ is locked at −4.5 dBm.

It is understood that an optical filter is not necessary for performing bit-inverted all-optical wavelength conversion. However, when an optical filter according to an embodiment of the invention is not used the quality is poor. This is seen from the eye diagram in FIG. 6, where we show the situation of an input signal at −9 dBm launched into the SOA without an optical filter (bottom eye diagram) and with an optical filter (top eye diagram). Not only is the eye much wider and less noisy but also the measured signal quality is much better with the optical filter.

In another alternative embodiment, a modulated or clock input signal is used to provide an all-optical 3R regenerator. For example, this can be realized by replacing the cw signal with a clock signal. The info of the input signal is mapped by means of the nonlinear media onto the clock signal. However, in contrast to the situation with the cw signal, here a converted output signal will be generated for the time of the duty cycle of the clock signal. As above, the inverted clock signal is then guided into the filter and reformatted. This new regenerated signal has the timing of the clock signal and is therefore retimed.

In another alternative embodiment, an optical regenerator comprises a nonlinear medium for encoding information from a first optical signal onto a second periodically modulated optical signal to generate a third optical signal. An optical filter apparatus is operatively coupled to the nonlinear medium for processing the third optical signal. The optical filter apparatus comprises a spectrum broadening device for spectrally dividing the third optical signal into a discrete set of spectral components on a discrete number of corresponding light channels. One or more processing devices are provided for individually processing one or more of the spectral components on the light channels. The optical filter apparatus is adapted to provide an amplitude, phase and frequency response to produce a desired output signal.

In another alternative embodiment, an optical filter comprises a nonlinear medium for modifying a first optical signal and generating a modified second optical signal. An optical filter apparatus is operatively coupled to the nonlinear medium for processing the modified second optical signal. The optical filter apparatus comprises a spectrum broadening device for spectrally dividing the third optical signal into a discrete set of spectral components on a discrete number of corresponding light channels. One or more processing devices are provided for individually processing one or more of the spectral components on the light channels. The optical filter apparatus is adapted to provide an amplitude, phase and frequency response to produce a desired output signal.

It is to be understood that 'desired output signal' as used herein refers to reformatted signals, regenerated signals and/or the like.

The above discussion has shown, that it is possible by means of the optical filtering apparatus and method of the present invention to perform signal transformation of one signal into a new signal. For those skilled in the art it will be obvious, that the present invention will allow one to perform a whole variety of linear pulse transformations.

The number of processor steps/devices introduced in the optical filter may determine the signal quality. The number of steps/devices needed also depends on the shape of the optical filter to be approximated. In general, one can perform any pulse transformation between two pulses as long as the needed transformation is linear and time-invariant. Even if the system is not totally linear and/or time-invariant, there exist solutions that will allow one to apply the present invention.

It will be appreciated by those skilled in the art that the method and apparatus of the invention can be applied to systems using various optical amplification schemes, for example, all-Raman, Raman/erbium-dope fiber amplifier (EDFA) hybrid, and EDFA only systems.

In view of the foregoing, one embodiment of the method of optical filtering of the invention comprises spectrally dividing one or more channels of an optical signal into a discrete set of spectral components for each channel; collecting the spectral components on a discrete number of corresponding light channels; individually processing one or more of the spectral components on the light channels; and recombining the spectral components on the light channels into the one or more channels of the optical signal. Processing one or more of the spectral components preferably comprises providing a group delay for one or more spectral components. The group delay may be on the order of several hundreds of wavelengths. Processing one or more of the spectral components may also comprise providing time delay, attenuation, amplification, phase shifting and/or other signal processing. Processing one or more of the spectral components may also comprise providing individual pulse shaping of one or more discrete spectral components.

Although the present invention has been described in accordance with the embodiments shown, one skilled in the art will readily recognize that there could be variations to the embodiments, and that those variations would be within the spirit and scope of the present invention as defined by the appended claims.

What is claimed is:

1. An apparatus for processing an optical signal comprising:
   a spectrum broadening device for spectrally dividing one or more channels of the optical signal into a discrete set of spectral components for each channel;
   a collector for collecting the spectral components on a discrete number of corresponding light channels;
   one or more processors for individually processing one or more of the spectral components on the light channels; and
   a combiner for recombining the spectral components on the light channels.

2. The apparatus of claim 1 wherein the spectrum broadening device is a device selected from the group consisting of an optical prism, a grating, a waveguide grating router, and an index graded media.

3. The apparatus of claim 1 wherein the collector comprises a plurality of planar waveguides.

4. The apparatus of claim 1 wherein the collector comprises a plurality of finite mirrors for collecting one or more spectral components.

5. The apparatus of claim 1 wherein the one or more processors include a delay device for providing a delay of one or more of the spectral components.

6. The apparatus of claim 5 wherein the delay is on the order of several hundreds of wavelengths.

7. The apparatus of claim 1 wherein the one or more processors include at least one of an attenuator, an amplifier, a phase shifter and a signal processor for providing individual pulse shaping of one or more of the spectral components.

8. The apparatus of claim 1 wherein the combiner is a device selected from the group consisting of a star coupler, a multimode-interference coupler, a directional coupler, a y-branch coupler, and a lens.

9. The apparatus of claim 1 wherein the optical signal comprises a wavelength multiplexed signal.

10. The apparatus of claim 1, further comprising a nonlinear medium for receiving one or more optical inputs and generating the optical signal, and wherein the one or more processors are adapted to provide a desired amplitude and time delay response to provide wavelength conversion of at least one of the one or more optical inputs.

11. The apparatus of claim 1, further comprising a nonlinear medium for receiving one or more optical inputs and generating the optical signal, and wherein the one or more processors are adapted to provide a desired amplitude, phase and frequency response to provide optical signal regeneration of at least one of the one or more optical inputs.

12. An apparatus for processing an optical signal comprising:
   a spectrum broadening means for spectrally dividing one or more channels of an optical signal into a discrete set of spectral components for each channel;
   a collecting means for collecting the spectral components on a discrete number of corresponding light channels;
   a processing means for individually processing one or more of the spectral components on the light channels; and
   a combiner means for recombining the spectral components on the light channels.

13. A method comprising: spectrally dividing one or more channels of an optical signal into a discrete set of spectral components for each channel;
   collecting each of the spectral components on a discrete number of corresponding light channels;
   individually processing one or more spectral components on the light channels; and
   recombining the spectral components on the light channels into the one or more channels of the optical signal.

14. The method of claim 13 wherein processing one or more of the spectral components comprises providing a group delay for one or more spectral components.

15. The method of claim 14 wherein the group delay is on the order of several hundreds of wavelengths.

16. The method or claim 13 wherein processing one or more of the spectral components comprises providing at least one of time delay, attenuation, amplification, phase shifting and other signal processing.

17. The method of claim 13 wherein processing of one or more of the spectral components includes providing individual pulse shaping of the one or more discrete spectral components.

18. An apparatus comprising:
   spectrum broadening and combiner means for spectrally dividing one or more channels of an optical signal into a discrete set of spectral components for each channel an for recombining the spectral components;
   collecting means operatively coupled to the spectrum broadening and combiner means for collecting the spectral components of the optical signal on a discrete number of corresponding light channels; and
   processing means operatively coupled to the collecting means for individually processing one or more of the spectral components on the light channels.

* * * * *